(No Model.)
M. A. STEVENS.
THREE WHEELED VEHICLE.
No. 281,575. Patented July 17, 1883.
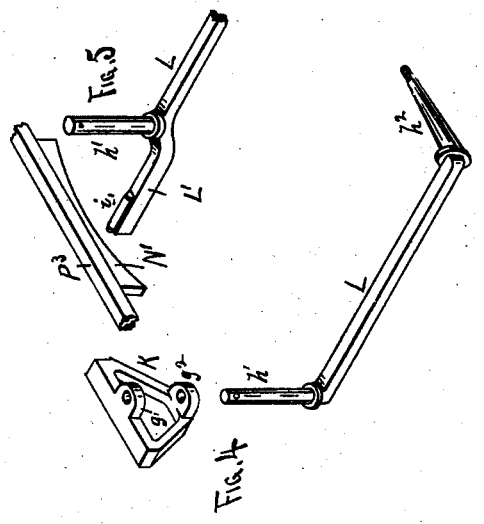
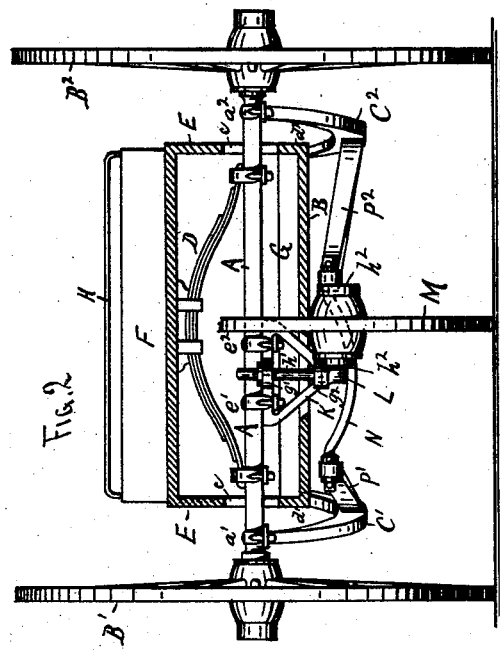
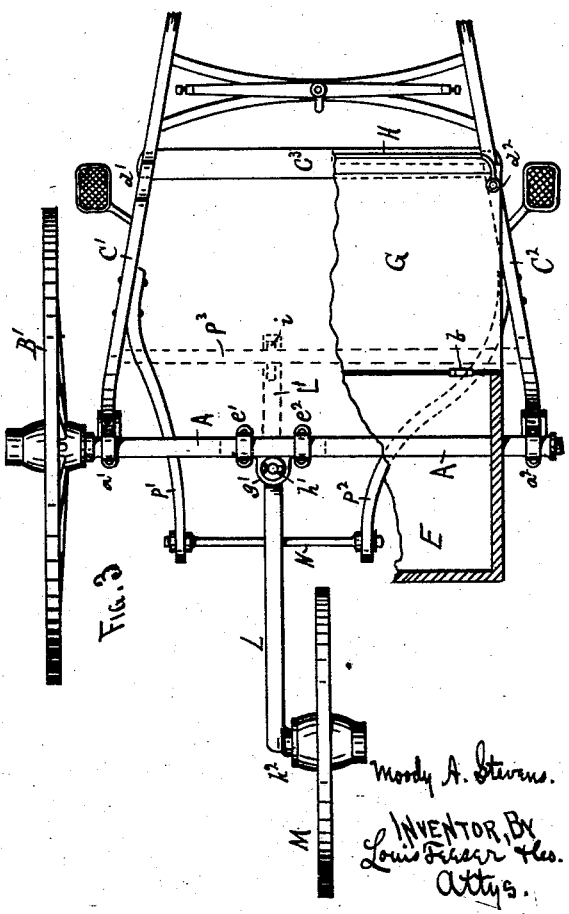
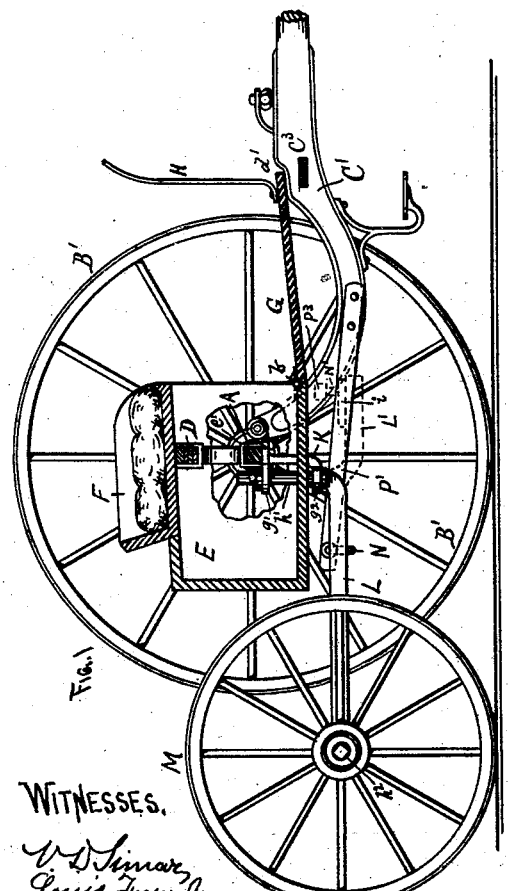
Witnesses.
Inventor, Moody A. Stevens,
By Louis Feuer &co.
Attys.

UNITED STATES PATENT OFFICE.

MOODY A. STEVENS, OF ANOKA, MINNESOTA.

THREE-WHEELED VEHICLE.

SPECIFICATION forming part of Letters Patent No. 281,575, dated July 17, 1883.

Application filed May 21, 1883. (No model.)

*To all whom it may concern:*

Be it known that I, MOODY A. STEVENS, a citizen of the United States, and a resident of Anoka, in the county of Anoka, in the State of Minnesota, have invented certain new and useful Improvements in Three-Wheel Vehicles, of which the following specification is a full, clear, and exact description, reference being also had to the accompanying drawings.

This invention relates to that class of vehicles in which three wheels are used; and it consists in the construction and arrangement of parts hereinafter shown and described, and then sought to be specifically defined by the claims.

In the drawings, Figure 1 is a sectional side elevation. Fig. 2 is a cross-sectional rear view, and Fig. 3 is a plan view with a portion of the seat and foot-board and the spring removed. Fig. 4 represents the third-wheel pivoting-frame and axle detached in perspective. Fig. 5 is a view similar to Fig. 4, showing a variation in the manner of lifting the trailing wheel when turning curves or corners.

The object of my invention is to produce a vehicle possessing all the advantages of a two-wheel gig without the annoyance of the jolting from the horse, which I accomplish by the means shown in the accompanying drawings, in which—

A is the axle, having the main wheels $B'$ $B^2$ journaled upon its ends, and the thills $C'$ $C^2$ coupled thereto loosely at $a'$ $a^2$ with any ordinary thill-couplings.

Mounted upon the axle A, by a spring, D, is a box or body, E, having a seat, F, upon its top and a foot-board, G, hinged at $b$, in the middle of the body, close up to the axle, the dash-board H being attached to this foot-board. The axle A passes through this body E, as shown, slots $c$ (see Fig. 2) being left in its ends, so that the body and seat can play up and down with the movement of the spring D.

The thills $C'$ $C^2$ are curved downward, forward, and upward, as shown, and the front edge of the foot-board G lies loosely upon the upper sides of the thills at $d'$ $d^2$, the curving of the thills causing the foot-board to come in contact with them at the points $d'$ $d^2$ only. A cross-bar, $C^3$, may be arranged to connect the thills beneath the front edge of the foot-board, and also to support the foot-board along the entire length of its front edge, if desired.

Attached to the central part of the axle A, by clips $e'$ $e^2$, or by other means, is a frame, K, having ears $g'$ $g^2$.

L is an axle, having one end, $h'$, bent upward at right angles thereto and secured loosely in the ears $g'$ $g^2$, while the other end, $h^2$, of the axle is bent off to one side horizontally, and supports a trailing wheel, M, as shown. By this means the wheel M will follow along after the vehicle and support the rear part of the body E and the larger part of the weight of the persons upon the seat F, and prevent the body tilting forward or backward. The body E, being held by the axle A only, would tilt forward or backward, according to which way the weight was placed, were it not for the third wheel; but by means of the third wheel all danger from this source is avoided. In running forward in a straight line the three wheels run parallel with each other; but when turning curves or corners the third wheel will swing upon its pivot $h'$. This action would cause the third wheel to drag sidewise to a certain extent, and to relieve this strain I arrange a curved rod, N, (supported by arms $P'$ $P^2$ from the thills $C'$ $C^2$,) beneath the axle L, so that when the vehicle is turned around curves or corners the axle L will slide upon the curved rod N and lift the wheel M slightly, and prevent it dragging sidewise upon the ground.

In place of the arms $P'$ $P^2$ and curved rod N, the device shown in dotted lines in Figs. 1, 3, and 5 may be used. This consists in extending the axle L at $L'$, and providing it, upon the upper side, with an anti-friction roller, $i$, adapted to rest beneath an upwardly-curving plate or rod, $N'$, attached to a cross-piece, $P^3$, attached by its ends to the thills $C'$ $C^2$, as shown; but the action and results are substantially the same. This latter arrangement possesses the advantage over the other form, in that it is more simple and is concealed from view beneath the body E. By this arrangement, the thills being pivoted to the axle, and the body being fixed to the axle and not connected to the thills except by the loose end of the hinged foot-board G, the motion of the horse will not affect the body or the persons riding, while at the same time the third wheel prevents the tilting of the body and seat.

Having described my invention and set forth its merits, what I claim is—

1. An axle having wheels journaled upon its ends, the thills coupled loosely to said axle, a body and seat fixed upon said axle, and a third wheel pivotally connected to said axle, substantially as and for the purpose set forth.

2. The combination of the axle A, having wheels $B'$ $B^2$ journaled upon its ends, the thills $C'$ $C^2$, coupled loosely to said axle, the body E and seat F, fixed upon said axle, the third wheel, M, means for connecting said wheel to said axle pivotally, and means for elevating said wheel M when turning curves or corners, substantially as and for the purpose set forth.

3. The combination of an axle, A, having wheels $B'$ $B^2$ journaled upon its ends, the thills $C'$ $C^2$, coupled loosely to said axle, the body E and seat F, fixed upon said axle, the third wheel, M, and means for pivotally connecting it to said axle, and the foot-board G, hinged by its rear edge to the body E and resting loosely at its front edge upon said thills, substantially as set forth.

4. The combination of the axle A, wheels $B'$ $B^2$, body E, foot-board G, thills $C'$ $C^2$, frame K, axle L, having the bent ends $h'$ $h^2$, wheel M, and means for elevating said wheel M when turning curves or corners, substantially as set forth.

5. The combination of the axle A, wheels $B'$ $B^2$, thills $C'$ $C^2$, body E, spring D, foot-board G, and wheel M, pivotally connected to said axle, substantially as and for the purpose set forth.

In testimony whereof I have hereunto set my hand in presence of two subscribing witnesses.

MOODY A. STEVENS.

Witnesses:
O. L. CUTTER,
P. H. WICKLAND.